Oct. 15, 1940.　　　C. H. OELSCHIG　　　2,218,435
LOCKING MEANS FOR THE DOORS AND WINDOWS
OF AN AUTOMOBILE BODY OR THE LIKE
Filed Oct. 10, 1939　　　3 Sheets-Sheet 1
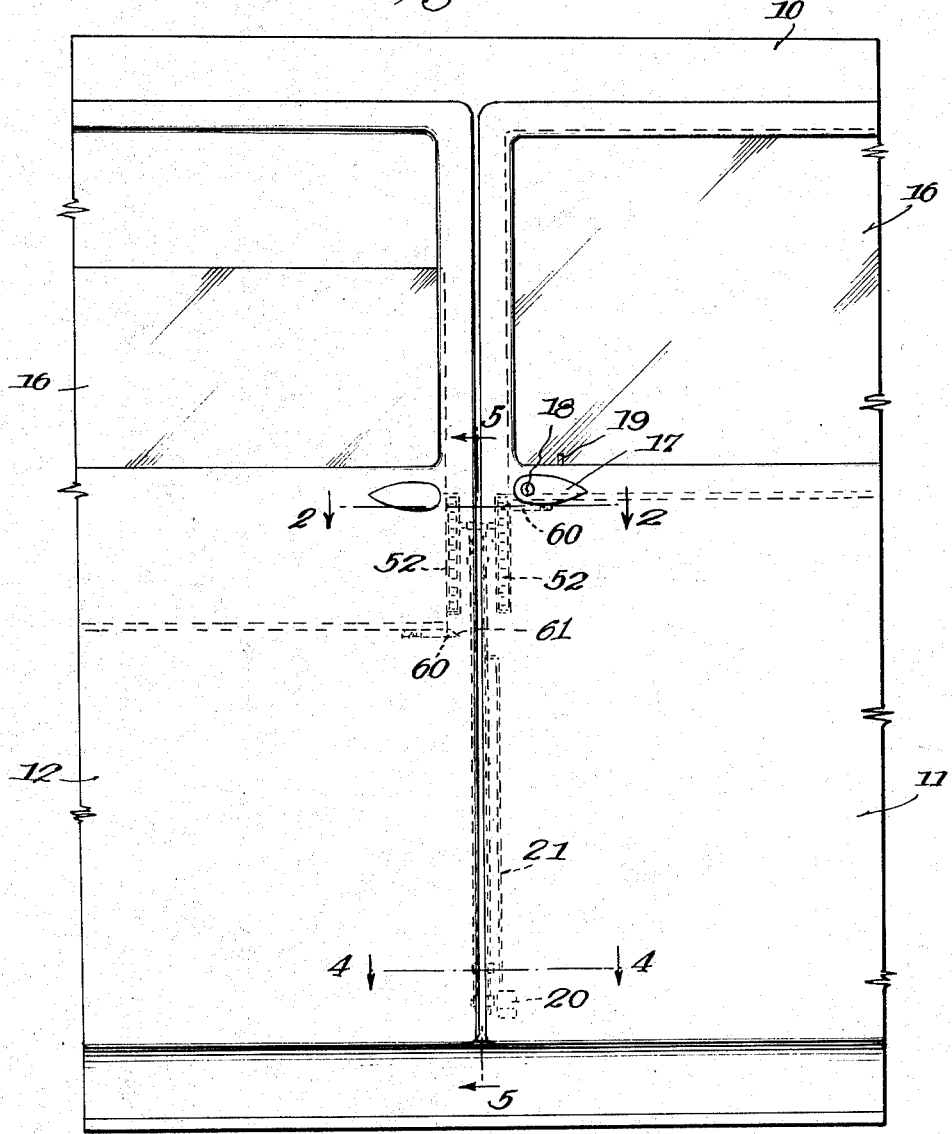
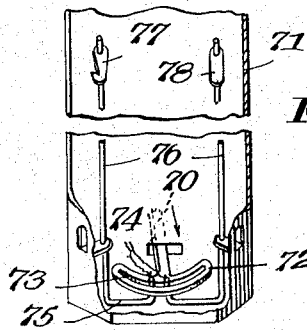
Inventor
C. H. Oelschig,
By Barry & Cyr
Attorneys Oct. 15, 1940. C. H. OELSCHIG 2,218,435
LOCKING MEANS FOR THE DOORS AND WINDOWS
OF AN AUTOMOBILE BODY OR THE LIKE
Filed Oct. 10, 1939 3 Sheets-Sheet 2
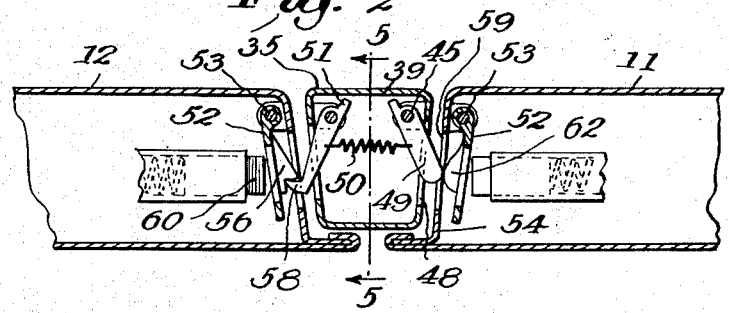
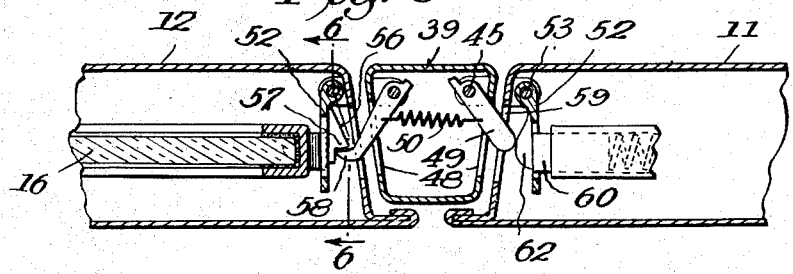
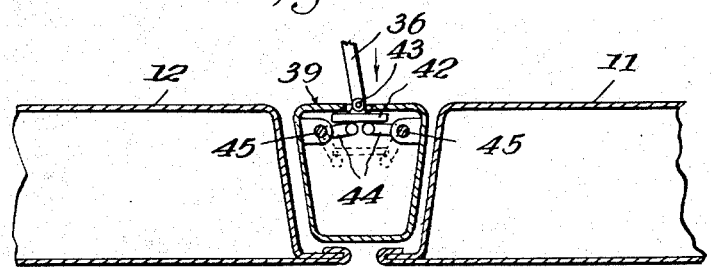
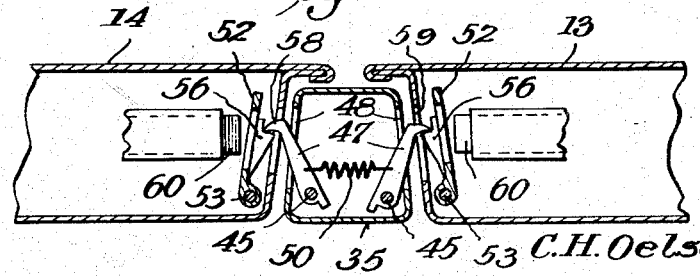
Inventor
C. H. Oelschig,
By Barry + Cyr
Attorneys

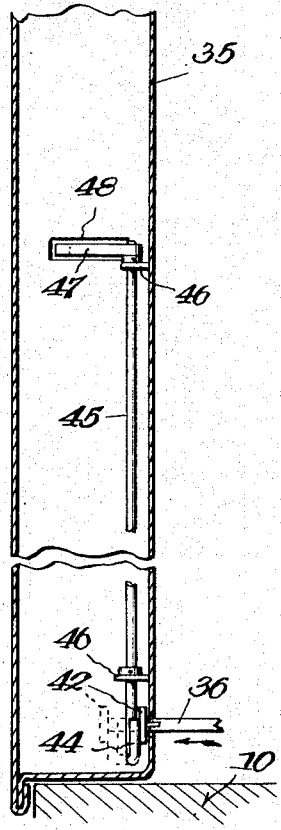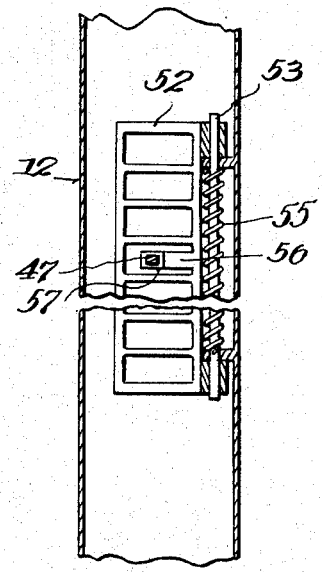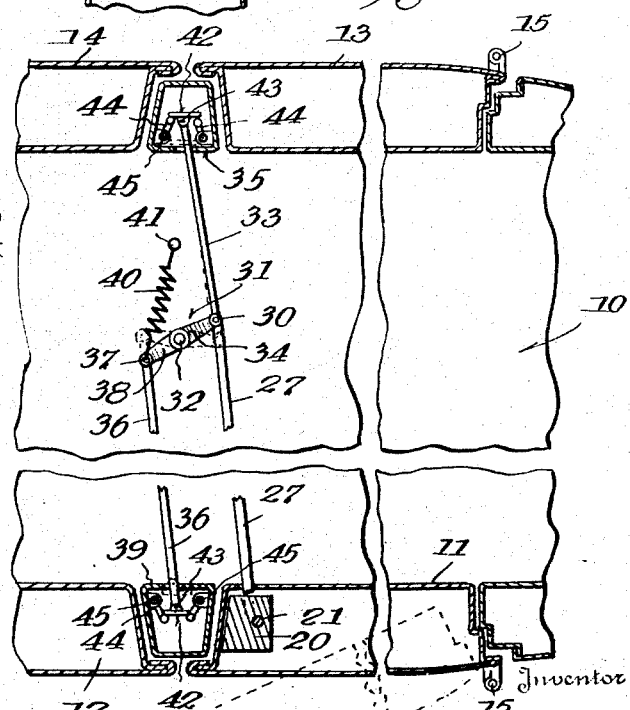

Patented Oct. 15, 1940

2,218,435

UNITED STATES PATENT OFFICE 2,218,435

LOCKING MEANS FOR THE DOORS AND WINDOWS OF AN AUTOMOBILE BODY OR THE LIKE

Carl H. Oelschig, Savannah, Ga., assignor of forty per cent to Fred W. Jones, Washington, D. C.

Application October 10, 1939, Serial No. 298,833

17 Claims. (Cl. 292—45)

This invention relates to improvements in locking devices and more especially to novel locking means for the doors and windows of motor vehicle bodies and the like.

The primary purpose of the invention is to provide a locking device for use with automobile bodies whereby means mounted on or adjacent to the master door of the car can be employed to lock all of the other doors of the car without locking the windows or simultaneously with the locking of the car windows when the master door is closed.

Another object is to supply novel locking mechanism which will permit a person within the car body to control the locking of all doors of the car, or all doors and the windows of the car.

A still further object is to supply a locking device of the above character which will allow an occupant of an automobile to raise the car windows while the latter are prevented from further opening movement. In other words, my improved mechanism may be used to lock the windows against opening but freely allow any window to be partially closed or completely closed if it should happen to be partially open.

A further object is to produce a simple and inexpensive device and yet one which will be exceedingly effective for the purpose for which it is designed.

Another object is to provide a locking mechanism consisting of relatively few parts so that it may be installed in an automobile body or the like at a relatively low cost.

With the foregoing objects outlined and with other objects in view which will appear as the description proceeds, the invention consists in the novel features hereinafter described in detail, illustrated in the accompanying drawings and more particularly pointed out in the appended claims.

In the drawings:

Fig. 1 is a fragmentary side elevation of an automobile body and illustrating a portion of my improved locking mechanism depicted in connection with the master door and the rear right door of the car.

Fig. 2 is an enlarged horizontal sectional view of a detail taken on the line 2—2 of Fig. 1 and showing parts in door-locking position.

Fig. 3 is a similar view but showing the mechanism in position to lock the rear right-hand door as well as the windows of the master door and said rear door.

Fig. 4 is an enlarged horizontal sectional view of a detail taken on the line 4—4 of Fig. 1.

Fig. 5 is a vertical sectional view taken on line 5—5 of Fig. 1 or Fig. 2.

Fig. 6 is a fragmentary vertical sectional view of a detail taken on the line 6—6 of Fig. 3.

Fig. 7 is a horizontal sectional view partly in elevation of mechanism for causing means within the door post to be actuated by an element controlled from the master door.

Fig. 8 is an edge view of a portion of the master door, partly broken away and illustrating the adjustable means in the master door for controlling the locking mechanism.

Fig. 9 is a perspective view, partly broken away of a detail of a modification.

Fig. 10 is a view similar to Fig. 2 but showing the locking mechanism for the left front and rear doors.

Referring to the drawings, 10 designates an automobile body having a master door 11, a right rear door 12, a left front door 13 (Fig. 7) and a left rear door 14, all hingedly mounted in the conventional manner as indicated at 15.

Each door has the usual vertical slidable window or window panel 16. In Fig. 1, the window of the master door is shown completely closed, that is, in its uppermost position while the window of the right rear door is shown partly lowered or in partially opened position.

The master door is provided with a handle 17, a lock 18 and any known type of manually operated means, indicated at 19, whereby the operator of the automobile may either lock or unlock the master door from the inside or the exterior of the car.

In accordance with the present invention the master door is provided with a control member 20 which may be in the form of a vertically movable block arranged within the door and provided with an upwardly extending resilient rod 21, terminating in a finger-actuated knob 22, adapted to occupy any one of the notches 23, 24 or 25 of a vertically slotted element 26. It is obvious that any suitable control member, such as a pedal or a knee-operated member could be employed instead of the knob 22.

The block controls movements of a substantially horizontally disposed rod 27, preferably arranged below the front seat of the car and adapted to project through an aperture 28, into the master door when the latter is closed. The block 20 has a notched corner portion 29 arranged adjacent to the aperture 28.

At this point it will be noted that if the block is in the position shown in Fig. 8, and the master door is closed, the block 20 will move the rod 27 to the maximum degree in the direction indicated by the arrow in that figure. However, if the knob 22 is raised and introduced into the notch 24, the block may also be elevated and place the notch 29 in position to receive the terminal of the rod 27. Hence, if the master door is closed with the block in this position, the block will cause the rod 27 to move only half the distance which it traveled while the block was in its lowermost position.

If the knob 22 is placed in the notch 25, the control block 20 will be raised to its uppermost position, and while so elevated it will not actuate the rod 27 at all.

As best shown in Fig. 7, the inner end of the rod 27 is pivotally connected at 30 to a rocking lever 31 pivotally mounted at 32 by any suitable means for movement about a vertical axis. A link 33 is pivotally connected at 30 to one arm 34 of the rocking lever and extends toward the left of the automobile body into the left door post 35. Another link 36 is pivotally connected at 37 to the other arm 38 of the rocking lever and projects toward the right into the right-hand door post 39 of the vehicle body.

A spring 40 connects the extremity of the arm 38 to a fixed terminal 41 within the body and acts to normally hold the parts in such position that they may be actuated when the rod 27 is moved by the block 20.

The links 33 and 36 are employed to control locking of all of the doors except the master door as well as all of the windows of the car. To this end, each link may terminate within a post in the form of an abutment 42 which is pivotally connected at 43 to the link. Each abutment impinges against a pair of crank arms 44 provided at the lower ends of rock shafts 45 which extend vertically within the post and are mounted in suitable brackets 46.

Each rock shaft with the exception of the one that rocks in conjunction with the master door, terminates at its upper end in a latch 47 adapted to move in a horizontal plane through a slot 48 in an edge of the post.

As may be seen from Figs. 2 and 3, the rock shaft 45 corresponding to the master door terminates in a finger 49 instead of a latch, as member 49 is not intended to accomplish locking of the master door.

The pair of latches 47 for the left doors are connected by a coil spring 50 which functions to normally hold them in retracted position, and to hold the crank arms 44 in contact with the corresponding abutment plate 42. The latch for the right rear door and the finger 49 are connected by a similar spring. Stops 51 are associated with the rock shafts to limit the swinging movement of the members 47 of the left-hand post toward one another as well as the movement of the latch 47 of the right-hand post and the finger 49, toward one another.

Each door is provided internally with a rack 52 hingedly mounted at 53, and yieldingly urged toward the adjacent edge 54 of the door by any suitable means, such as a coil spring 55 (see Fig. 6). Each rack, with the exception of the one in the master door, is provided with a keeper 56 having a notch 57 to receive the nose 58 of a latch, and the edge portion 54 of each door is slotted as shown at 59, the slots 59 of all of the doors except the master door being positioned to permit the latches 47 to swing toward the doors so as to engage the keeper of the corresponding rack either to lock the doors alone or to lock the windows as well, as will be hereinafter explained.

If the control block 20 is in intermediate position with the knob 22 occupying the notch 24, and the master door is closed, the latches 47 through the instrumentality of the rod 27 will be moved into the position shown in Fig. 10 and at the left-hand portion of Fig. 2. Consequently, the rear doors and the left front door will be locked. However, the racks 52 at this time will not be swung far enough to interfere with movement of the windows. For the locking of the latter, each window is provided at its lower edge with a spring-pressed bolt 60, which, as best shown at 61 in Fig. 1, is tapered at one end from top to bottom so that it can act as a pawl and move upwardly along the teeth of a rack 52 (when the latter is in proper position as shown in Fig. 3) but cannot move downwardly along the rack because if downward movement is attempted, the bolt will interlock with its complementary rack.

If the control block 20 is in its lowermost position when the master door is closed, the rod 27 and the mechanism between it and the latches and the member 49, will not only cause the locking of the rear doors and the left front door but place the racks in position, as shown in Fig. 3, to prevent the windows from being lowered.

As before stated, the member 49 does not function to lock the master door. It simply coacts with an abutment 62 on the rack of the latter to move such rack when desired into position to prevent lowering of the window of the master door.

Instead of using the abutments 42 and the springs 50, I may employ the alternate structure shown in Fig. 9. In this construction each link 70 corresponding to a link 33, 36, may terminate within the post 71 in a terminal 72 provided with an arc-shaped slot 73 to accommodate the upstanding fingers 74 of the crank arms 75, arranged at the lower ends of the rock shafts 76 corresponding to the shafts 45. Obviously if the link 70 (Fig. 9) is moved in the direction of the arrow, the fingers 74 will travel in the slot 73 and cause the latch 77 for the right rear door to move in a clockwise direction and the finger 78 (which actuates the master door rack) to move in a counter-clockwise direction.

From the foregoing, it will be understood that if the control block 20 is in fully elevated position when the master door is closed, none of the elements of my locking mechanism will be actuated. On the other hand if the knob 22 is in the notch 24 when the master door is closed, the notched portion 29 of the block will actuate the latches 47 (77) and the finger 49 (78) to bring them into the positions shown in Figs. 2 and 10, with the result that all of the doors except the master door will be locked. At such time the master door may be locked either from the inside or the outside of the car by manipulation of the button 19.

Finally, if the block 20 is placed at its lowermost position before the master door is closed, the latches 47 will not only be brought into position to lock all of the doors with the exception of the master door but the members 47, 49, will swing all of the racks 52 into position to cooperate with the pawls or bolts 60, so as to lock all windows of the car against downward movement. Of course, if a window of the car should be partially down at the time of such locking, it could be raised from the inside in the usual way by actuating the conventional crank handle.

It will be noted that the springs 50 acts not only to normally retain the parts 47 and 49 in retracted position, but serves to prevent parts from rattling.

While I have disclosed workable embodiments of the invention in such manner that the details of construction and advantages of the invention may be readily understood, I am aware that changes may be made in the structures disclosed without departing from the spirit of the invention as expressed in the claims.

What I claim and desire to secure by Letters Patent is:

1. In combination with an automobile body or the like having doors and windows in said doors, one of said doors being a master door, locking means for all doors of the body with the exception of the master door controlled by the closing of the master door, and window-locking means for all windows of the automobile operatively connected with first-mentioned means and responsive to operation of the master door.

2. In combination, an automobile body or the like having doors and windows in said doors, one of said doors being a master door, means for simultaneously locking all of said doors with the exception of the master door when the latter is closed, and window locking means operatively connected to the last-mentioned means and responsive to the operation of the latter for locking the windows when the master door is closed.

3. In combination with an automobile body or the like having doors and windows in said doors, one of said doors being a master door, locking means for all doors of the body with the exception of the master door controlled by the closing of the master door, and window-locking means for all windows of the automobile operatively connected with the first-mentioned means and responsive to operation of the master door, the first-mentioned means comprising movable latches in the automobile body and movable keepers positioned within all of the doors except the master door.

4. In combination with an automobile body or the like having doors and windows in said doors, one of said doors being a master door, locking means for all doors of the body with the exception of the master door controlled by the closing of the master door, and window-locking means for all windows of the automobile operatively connected with the first-mentioned means and responsive to operation of the master door, the locking means for the windows comprising racks movably mounted within the doors and pawls movable with the windows and cooperating with the racks.

5. In combination with an automobile body or the like having doors and windows in said doors, one of said doors being a master door, locking means for all doors of the body with the exception of the master door controlled by the closing of the master door, window-locking means for all windows of the automobile operatively connected with the first-mentioned means and responsive to operation of the master door, and a control device for the first-mentioned means movable to cause locking of all of the doors except the master door without locking the windows when the master door is closed.

6. In combination, an automobile body or the like having doors and windows in said doors, one of said doors being a master door, common locking means for all of said doors except the master door, locking means for the windows in at least some of said doors, operatively connected with the first-mentioned locking means, and a manually operated device for controlling both of said means whereby all of the doors except the master door may be simultaneously locked independently of the locking of the last-mentioned windows or the last-mentioned windows may be locked simultaneously with the last-mentioned doors.

7. In combination, an automobile body or the like having doors and windows in said doors, one of said doors being a master door, common locking means for all of said doors except the master door, locking means for the windows in at least some of said doors, operatively connected with the first-mentioned locking means, and a manually operated device for controlling both of said means whereby all of the doors except the master door may be simultaneously locked independently of the locking of the last-mentioned windows or the last-mentioned windows may be locked simultaneously with the last-mentioned doors, the control device comprising a manually controlled adjustable element carried by the master door.

8. In combination, an automobile body or the like having doors and windows in said doors, one of said doors being a master door, common locking means for all of said doors except the master door, locking means for the windows in at least some of said doors, operatively connected with the first-mentioned locking means, and a manually operated device for controlling both of said means whereby all of the doors except the master door may be simultaneously locked independently of the locking of the last-mentioned windows or the last-mentioned windows may be locked simultaneously with the last-mentioned doors, the window-locking means comprising racks pivotally mounted in certain of the doors and spring-pressed pawls connected to the windows of the last-mentioned doors and cooperating with the racks of those doors.

9. In locking mechanism of the character described, a door post, doors associated with the post, windows in the doors, rack and pawl mechanism operatively associated with the windows and doors to prevent the windows from being open but allowing the windows to be closed, and means mounted in the door post and cooperating with the rack and pawl mechanism for simultaneously locking the windows against opening movement.

10. In locking mechanism of the character described, a hollow door post and hollow doors, latches pivotally mounted in the post, said posts having slots in opposite sides thereof to permit the latches to be projected from the posts, adjacent edges of the doors being slotted to receive the latches, racks hingedly mounted in the doors and provided with keepers engageable by said latches, means for simultaneously moving the free ends of the latches in opposite directions to cause them to engage the keepers, and windows in the doors having yielding pawls engageable with said racks to prevent opening of the windows when the racks have been swung by the latches into a predetermined position.

11. The combination with an automobile body having hollow door posts, hollow doors, and windows in the doors, one door being a master door, of locking means for all of the doors except the master door comprising a train of elements, some of which are arranged in the door post and others of which are arranged in the doors with the exception of the master door, window-locking means operably connected with said train of mechanism, and a control member for said train of mechanism carried by the master door.

12. The combination with an automobile body having hollow door posts, hollow doors, and windows in the doors, one door being a master door, of locking means for all of the doors except the master door comprising a train of elements, some of which are arranged in the door post and others of which are arranged in the doors with the exception of the master door, window-locking means operably connected with said train of mechanism, and a control member for said train of mechanism carried by the master door, said control element being adjustable relatively to the master door to vary the movement of the train of mechanism whereby all of the doors except the master door may be simultaneously locked independently of the locking of the windows or the windows may be locked simultaneously with the last-mentioned doors.

13. The combination with an automobile body having front and rear doors with windows therein, one of the doors being a master door, of manually controlled means for locking all of the doors except the master door responsive to closing of the master door, and window-locking means for all of the doors operatively connected with the last-mentioned means.

14. The combination with an automobile body having front and rear doors with windows therein, one of the doors being a master door, of manually controlled means for locking all of the doors except the master door responsive to closing of the master door, and window-locking means for all of the doors operatively connected with the last-mentioned means, the first-mentioned means comprising a manually adjustable element carried by the master door.

15. The combination with an automobile body having door posts, doors associated therewith, and windows in the doors, one of the doors being a master door, of means for locking all of said doors with the exception of the master door and controlled by movement of the latter, said means comprising latches movably mounted in the posts, a rocking lever, oppositely extending links having adjacent ends pivotally connected to the ends of the rocking lever, said links projecting into said posts, means arranged in the posts and operatively connecting the links to said latches, and means including said latches for simultaneously locking said windows when the doors, with the exception of the master door, are locked.

16. In locking means for a door and window of an automobile body or the like, a door having a window movably mounted therein, locking means for said door, locking means for the window controlled by movement of the door-locking means, and a manually controlled device for controlling both of said means whereby the door may be locked independently of the window or the window may be locked simultaneously with the door.

17. In combination with an automobile body or the like, having doors and windows in said doors, one of said doors being a master door, locking means for certain doors of the body with the exception of the master door, controlled by the closing of the master door, and locking means for certain windows of the automobile operatively connected with the first-mentioned means and responsive to operation of the master door.

CARL H. OELSCHIG.